O. S. & C. F. LEE.
BALING MACHINE.
APPLICATION FILED APR. 14, 1906.

899,309.

Patented Sept. 22, 1908.

Witnesses.
W. J. Budd
Joe A. Young

Inventors.
Orlan S. Lee
Crawford F. Lee

O. S. & C. F. LEE.
BALING MACHINE.
APPLICATION FILED APR. 14, 1906.

899,309.

Patented Sept. 22, 1908.
11 SHEETS—SHEET 6.

Witnesses.
W. P. Budd
Geo. A. Young

Inventors
Orlaw S. Lee
Crawford F. Lee

UNITED STATES PATENT OFFICE.

ORLAN S. LEE AND CRAWFORD F. LEE, OF YOUNGSTOWN, INDIANA.

BALING-MACHINE.

No. 899,309.  Specification of Letters Patent.  Patented Sept. 22, 1908.

Application filed April 14, 1906. Serial No. 311,781.

*To all whom it may concern:*

Be it known that we, ORLAN S. LEE and CRAWFORD F. LEE, citizens of the United States, residing at Youngstown, in the county of Vigo, in the State of Indiana, have invented a new and useful Baling-Machine, of which the following is a specification.

Our invention relates to self binding, baling machines which will bale straw as fast as it comes from the thresher or fodder as fast as it comes from the shredder and automatically bind the bales with wire.

Our invention comprises, first:—novel means for feeding the material into the bale chamber, second:—novel means for binding the bales with wire, third:—novel means for putting feeding and binding mechanisms alternately into and out of gear with the main driving gear.

Our invention comprises further certain novel features of detail, construction and arrangement of parts, which will be described hereinafter and pointed out in the claims.

We will proceed to fully describe our invention with reference to the accompanying drawings in which.

Figure 1:
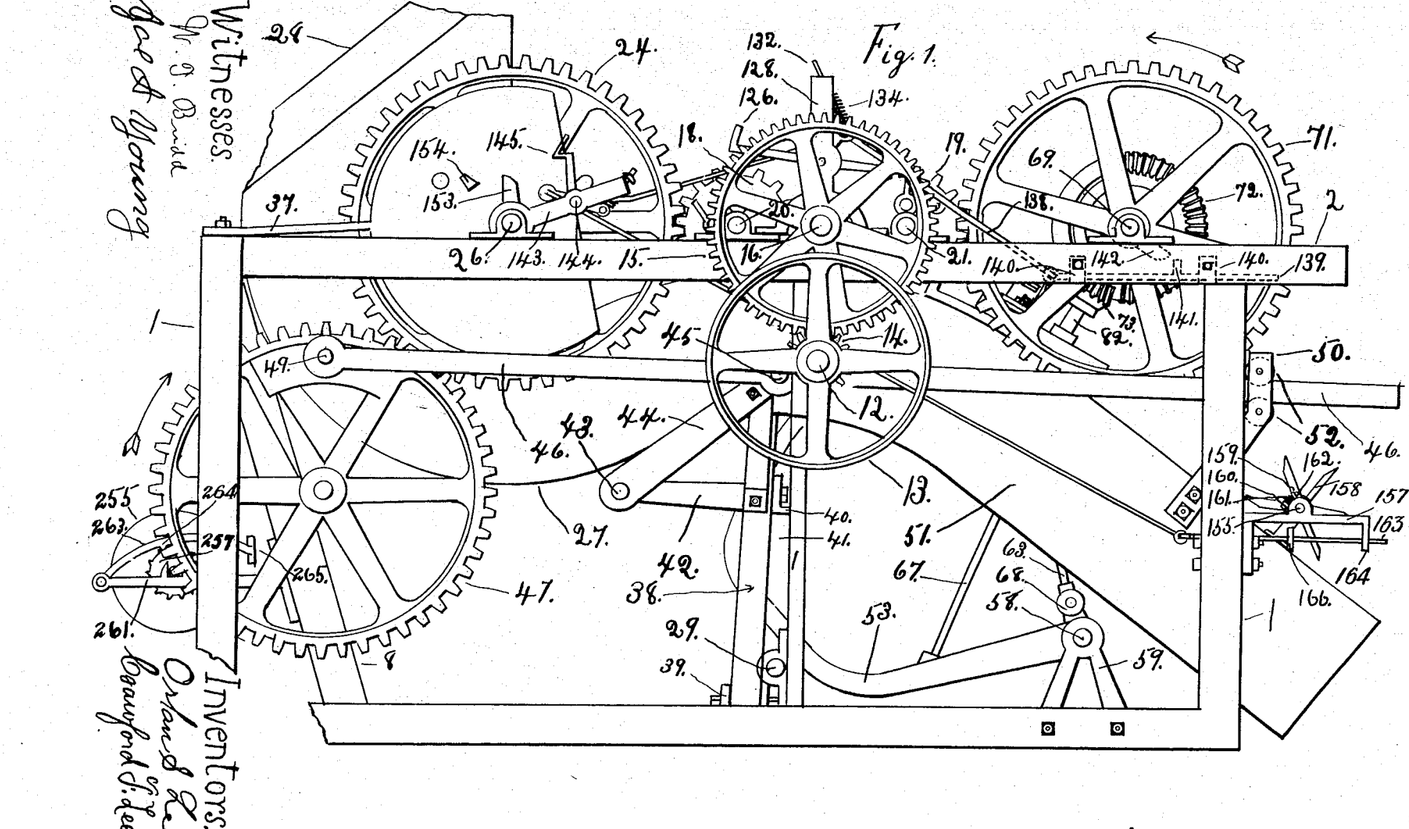
Figure 1 is a side elevation of the machine.
Figure 3:
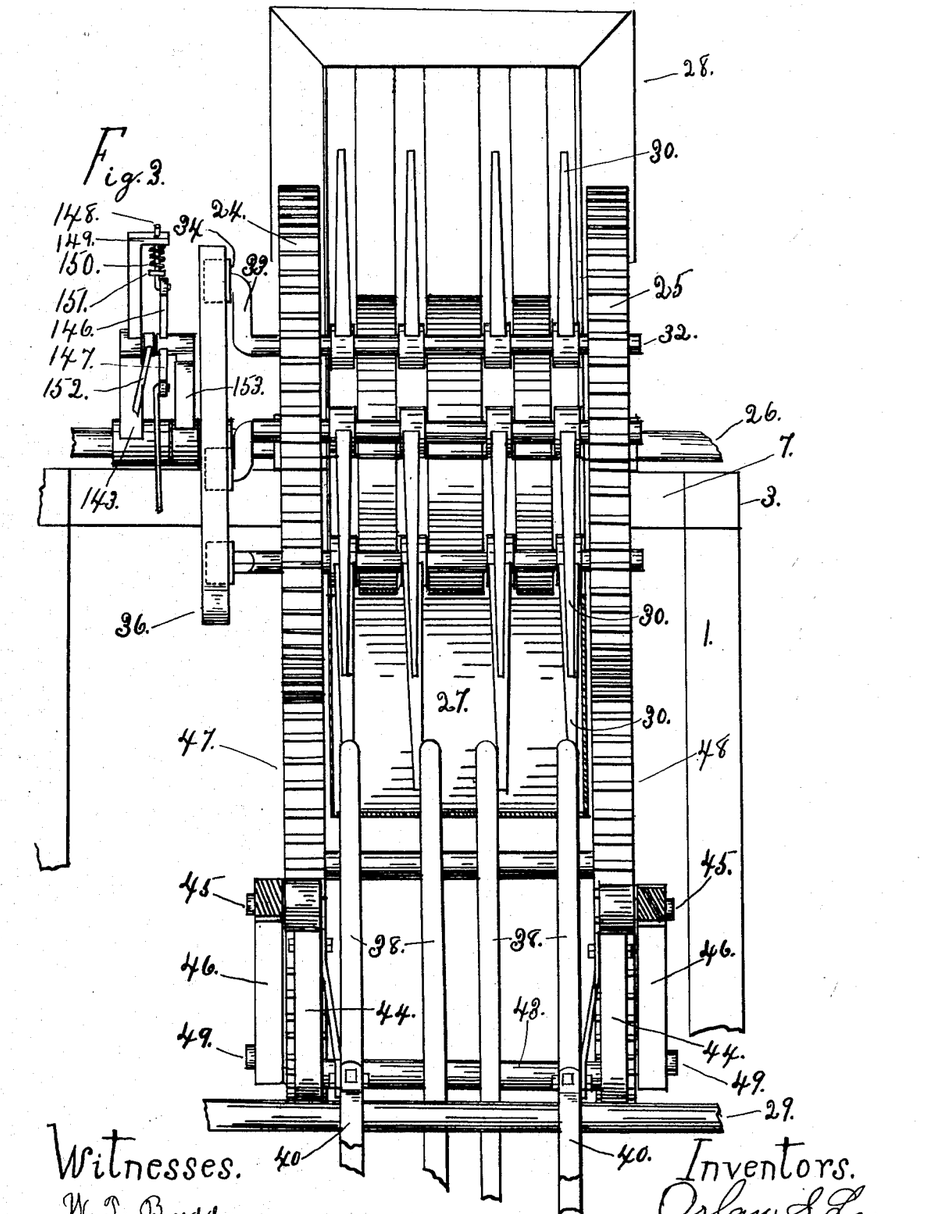
Fig. 3 is a rear view of feeding and pressing parts, looking in direction of arrow in Fig. 2.
Figure 23:
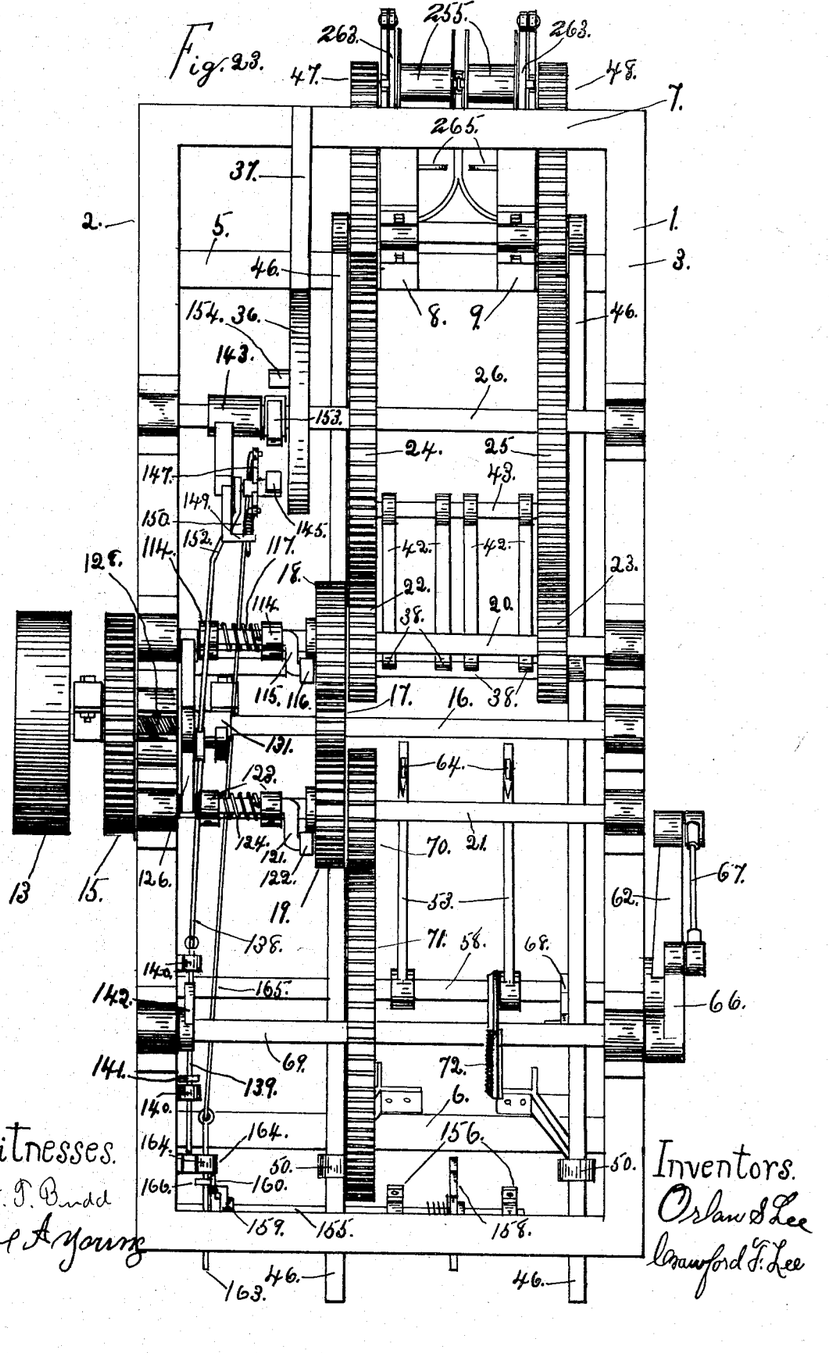
Fig. 23 is a top view of the machine with the chute and twisting mechanism removed.

Referring to Figs. 1, 3 and 23, the frame of the machine designated in general by 1, including the four corner uprights and the two intermediate uprights secured to the sills, transverse bars between the forward two and rear two uprights, longitudinal bars 2 and 3 at the sides of the top of the frame connecting the uprights, three transverse bars, two of which 5 and 6 are shown connecting the sills and oblique brace bars 8 and 9 secured at their upper end to transverse bar 7 and at their lower ends to transverse bar 5.

Figures 24, 25, 26, 27, 28:
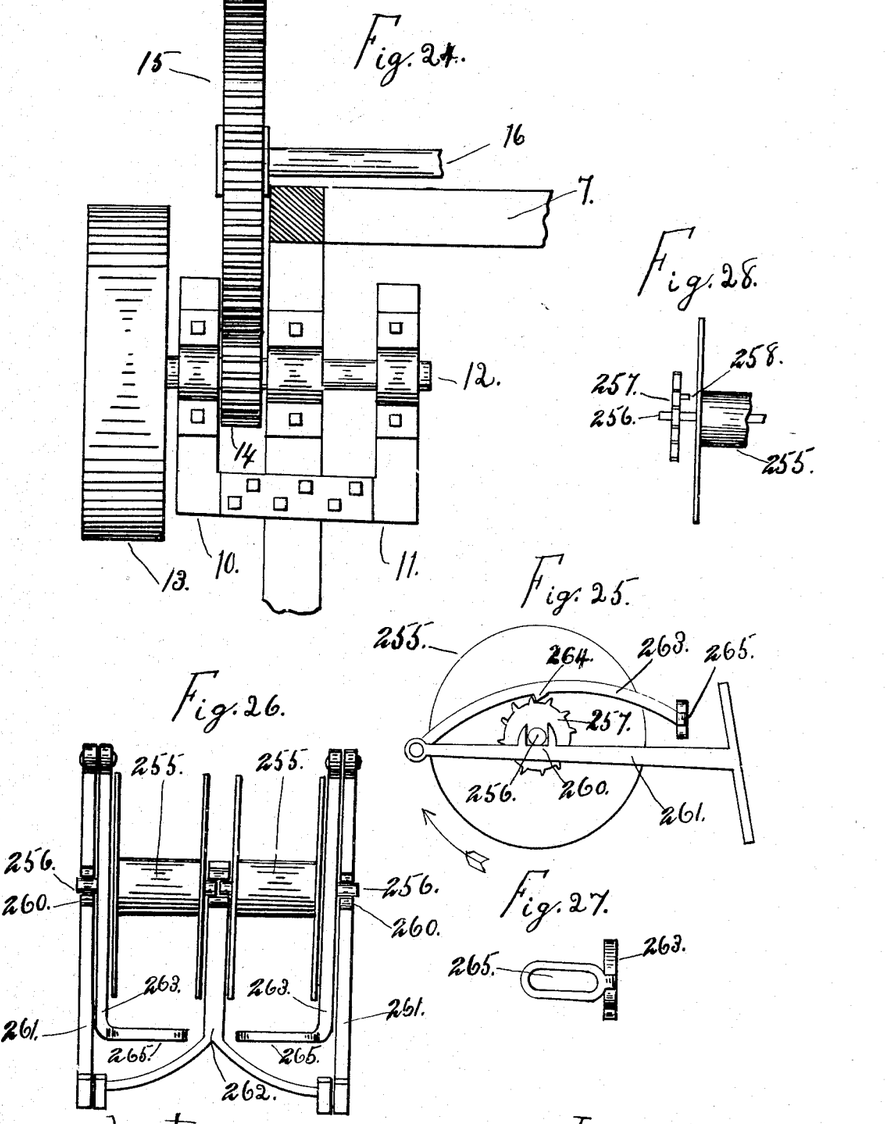
Fig. 24 is a rear view of main driving shaft and a section of the frame.
Fig. 25 is a side view of wire spools and their mechanism.
Fig. 26 is a top view of Fig. 25.
Fig. 27 is a detail view of arm 263.
Fig. 28 is a detail view of ratchet-wheel 257.

Referring especially to Fig. 24, a bar 10, parallel to intermediate upright has its lower end bent inwardly and secured to said upright; a bar 11, parallel to intermediate upright has its lower end bent outwardly and secured to said upright. The main drive shaft 12, the end of which is shown in Fig. 1, and in plan in Fig. 24 is mounted in boxes secured to bars 10 and 11 and is actuated by the belt pulley 13. Said shaft carries a pinion 14, which drives a gear wheel 15, mounted on a rotatable shaft 16.

Figure 19:
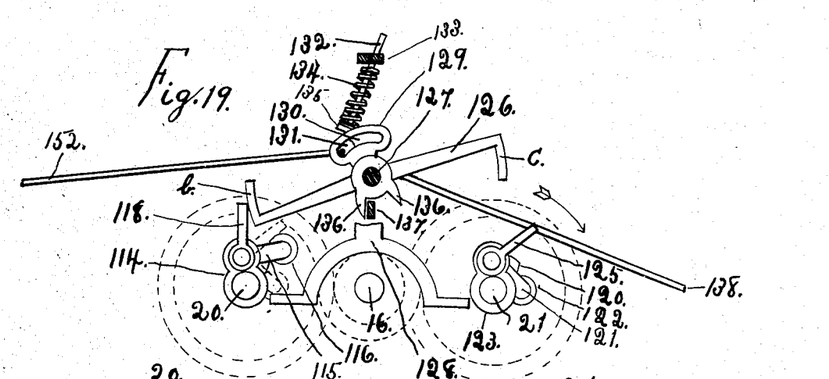
Fig. 19 is a detail side elevation with the standard cut away of gear shifting mechanism.
Figure 20:
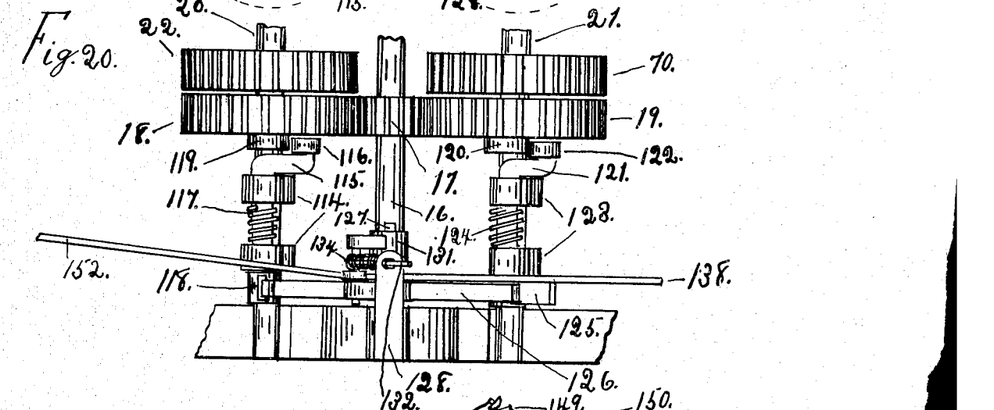
Fig. 20 is a top view of gear shifting mechanism.
Figures 21, 22:
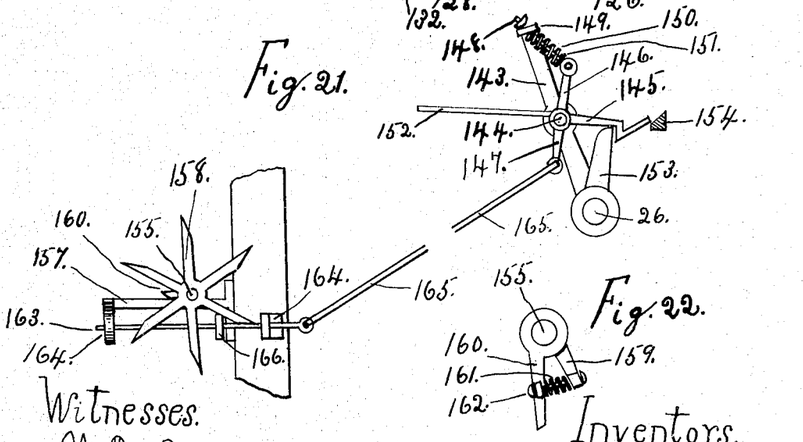
Fig. 21 is a side elevation of the mechanism for operating gear shifting mechanism.
Fig. 22 is a detail view of arms 159 and 160.

Referring now to Figs. 19, 20 and 23, on the shaft 16 is secured a gear wheel 17, which drives gear wheels 18 and 19 secured on shafts 20 and 21 in the direction of arrows Fig. 19.

On the shaft 20 are secured the gear wheels 22 and 23 which drives gear wheels 24 and 25 secured on rotatable feeder shafts 26.

Figure 2:
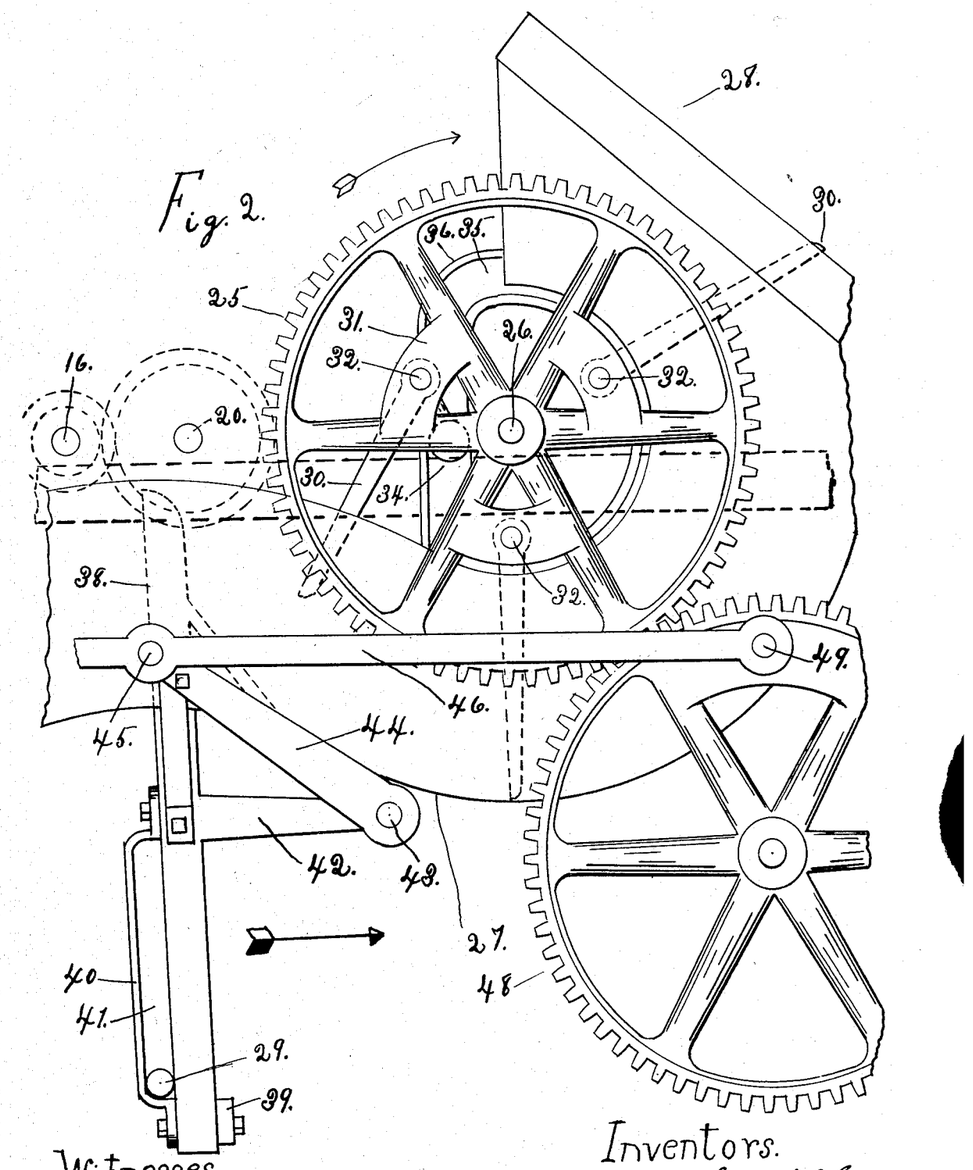
Fig. 2 is a sectional view showing the feeding and pressing parts.
Figure 4:
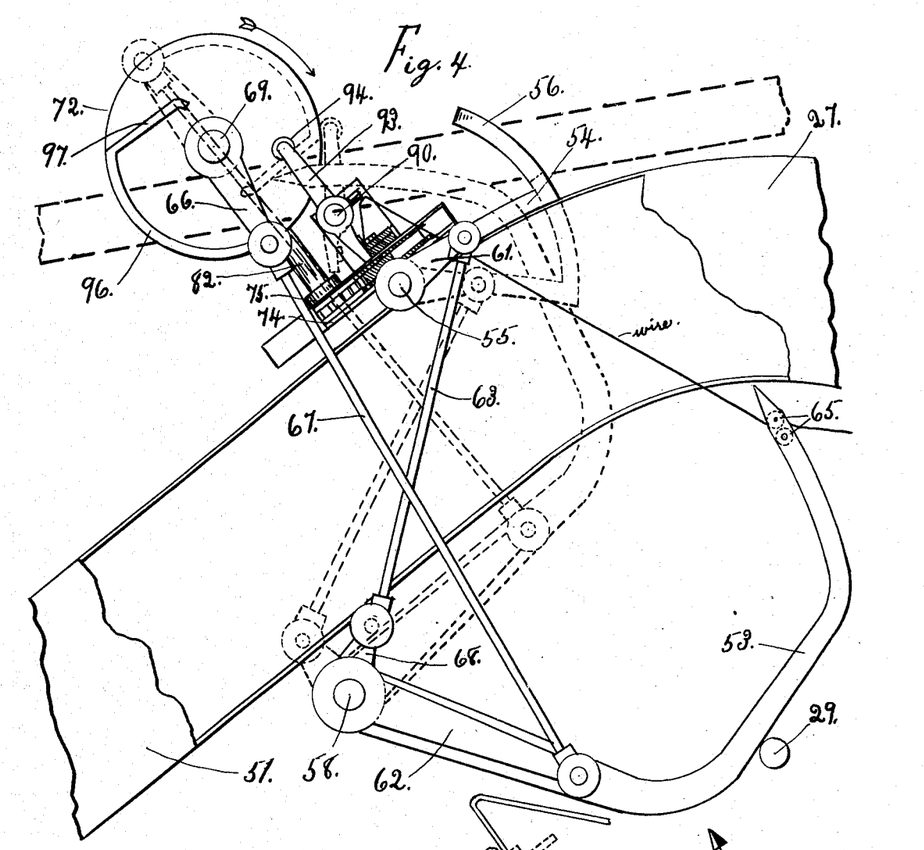
Fig. 4 is a side elevation of the binding mechanism.

Referring now to Figs. 1, 2, and 4 the chute 27 into the mouth 28 of which the material to be baled is introduced, has its upper portion formed in the arc of a circle, of which the feeder shaft 26 is the center and its central portion is reversely curved in the arc of a circle of which the pivot shaft 29 is the center. The chute 27 is secured to the frame at its upper and lower end in any suitable manner. The upper and rearward wall of chute 27 has a plurality of slots therein, Fig. 3 through which the feeder arms 30 are driven, in the following manner. The gear wheels 24 and 25 have integral with their spokes at equal distance from their centers, a plurality of boxes 31 in which are mounted the transverse shafts 32 parallel to feeder shaft 26. To each of transverse shafts 32 is secured a plurality of feeder arms 30. One end of each of said transverse shafts is provided with a crank arm 33 carrying a roller 34 which travels in the groove 35 of the stationary cam 36 secured to frame 1 by braces 37. Said cam is circular excepting the substantially straight portion as shown in Figs. 1 and 2.

The gear wheels 24 and 25 rotate in direction of arrow (Fig. 2) thereby carrying the transverse shafts 32 and causing the feeder arms, 30, to descend through the chute 27, thereby carrying the straw to a certain point. At this point it is necessary that the feeder arms 30 be raised out of the straw instead of continuing their circular path. This vertical motion is effected by the action of the offset in cam 36 upon roller 34 which is to cause a slight rotation of transverse shafts 32 and a consequent change in the angle of feeder arms 30 as shown in Fig. 2. After said feeder arms are withdrawn from the chute 27 they reassume their radial position which they retain until again raised from the chute.

Figures 5, 18:
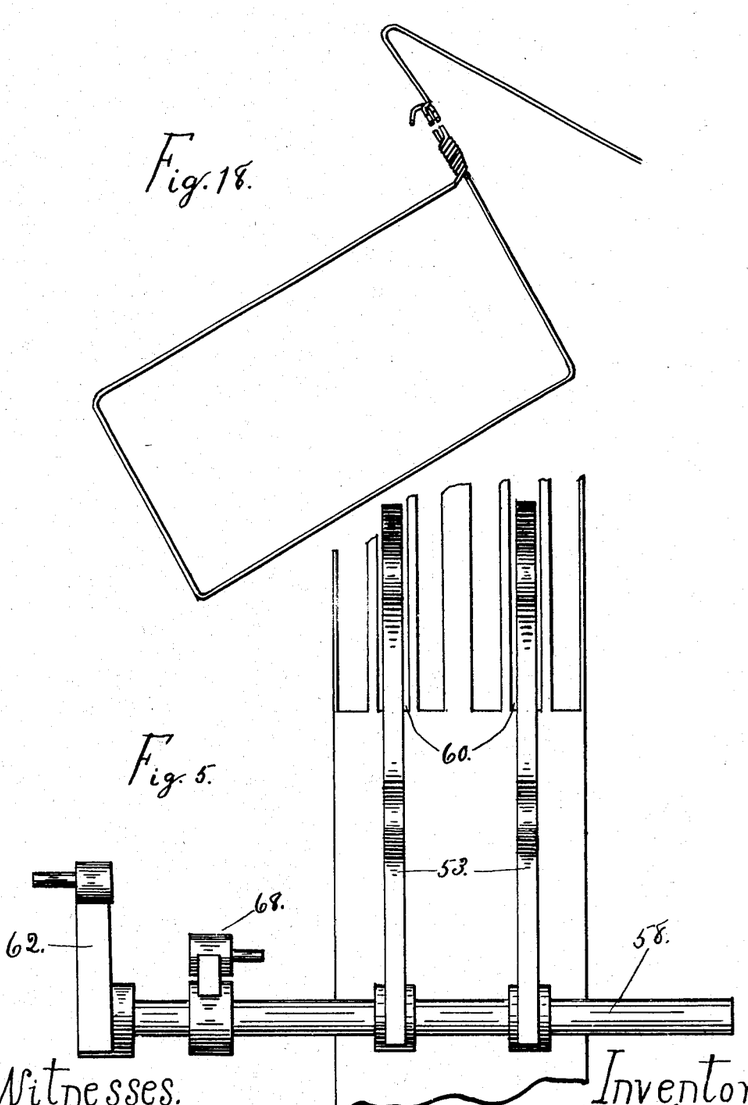
Fig. 5 is an elevation of a section of the chute and bale chamber and the needles and their actuating mechanism looking in the direction of arrow in Fig. 4.
Fig. 18 is a view of Fig. 17 with the wire twisted, severed and retained by the retainer disk, and released by temporary retainer.

Referring now to Figs. 1, 2, 3, and 23, the straw is taken up at the point where feeder arms 30 leave it by oscillating press prongs 38 playing in slots formed in the lower side of the chute 27 Fig. 5. The press prongs 38 are secured together at their lower ends by means of the cross bar 39 and are retained in their position on the pivot shaft 29 by means of guide bar 40 secured to said press prongs, thereby forming a slot 41 which permits of a radial movement of said press prongs up into and out of the chute 27. Rearwardly extending arms 42 integral with said press prongs have secured thereto a cross bar 43. Forwardly extending arms 44 are secured to the ends of said cross bar, said arms having transverse wrist-pins 45 in alinement with the face of said press-prongs. Pitmen 46 are mounted on said wrist-pins and are actuated by gear wheels 47 and 48 at the sides of the machine which are driven by gear wheels 24 and 25. It is evident that the revolution of gear wheels 47 and 48 will cause an oscillating movement of press-prongs 38 about pivot shaft 29.

Referring now to Fig. 1 the pitmen 46, one of which is shown are mounted on wrist-pins 49 from gear wheels 47 and 48. The other end of said pitmen pass through the stationary guides 50 secured to bale chamber 51. Press-prongs 38 are thus suspended on said pitmen. Gear wheels 47 and 48 rotate in direction indicated by arrows in Fig. 1 causing the points of the press-prongs 38 to describe an elliptical path, the upper curve of which corresponds substantially with the curvature of chute 27 as will be readily understood by reference to Figs. 1, 2, and 3. Figs. 1 and 2 show their position at the half-way point of their rearward throw with said press-prongs up into the chute 27. Fig. 3 shows their position at the half way point of their forward throw with said press-prongs beneath the chute 27.

The revolution of gear wheels 47 and 48 by means of pitmen 46 and guides 50 produce an oscillating and radial movement of press-prongs 38, thereby carrying said press-prongs up into the chute 27 during the rearward throw and beneath the chute 27 during the forward throw thus forcing the straw into the bale chamber 51. Guides 50 through which pitmen 46 move in their reciprocating movement are provided with anti-friction rollers 52.

Referring now to Figs. 4, 1, 5, 6, 23 the wire carrying needles 53 and guard arms 54 will next be described. When the bale chamber 51 is filled with straw some loose straw may be in the chute 27 above the bale chamber 51. It is desired that this may be moved out of the way and insure a clear passage for the wire carrying needles 53. A transverse shaft 55 is pivotally mounted on the upper and forward end of bale chamber 51. A plurality of parallel pairs of guard arms 54 are secured to said transverse shaft. Each pair of guard arms 54 terminate at their outer ends in a loop 56, said loop being curved upward in the arc of a circle with said transverse shaft as its center. The straight portion of said guard arms being parallel with the upper surface of chute 27 and in alinement with slots 57 cut in the chute 27. A transverse rocker shaft 58 is mounted in the hangers 59 from the frame 1. Wire carrying needles 53 are secured to said rocker-shaft in alinement with slots 60 cut from the chute 27 Fig. 5. Slots 60 are parallel to slots 57. Means are provided for operating needles 53 and guard arms 54 in conjunction, said means consisting of crank arms 61 secured to transverse shaft 55 an arm 68 secured to rocker-shaft 58, a pitman rod 63 connecting arm 68 and crank arm 61, said rocker-shaft being actuated by shaft 69 by means of crank arm 66 secured on shaft 69, a pitman rod 67 connecting said crank arm to arm 62 secured on rocker-shaft 58. Said arm 62 and pitman rod 67 being of predetermined lengths to give desired movement to needles. When the binding mechanism is set in motion as hereinafter described, shaft 69 is revolved thereby bringing needles 53 to the upper end of their throw as shown in dot in Fig. 4 thereby carrying the wires into the twisters and retainers. As the needles 53 ascend through the chute 27 guard arms 54 by means of arm 68, a pitman rod 63 and crank arm 61 are forced downward into chute 27, said needles passing through the looped portions of said guard arms.

Each wire needle has near its end a slot 64 Fig. 23 in which are mounted two or three grooved anti-friction rollers 65 Fig. 4 which prevent the wires from catching on the edge of said slot. The wires are taken from reels or spools passed through the slots 64 and caught in the retainer hereinafter described.

Referring now to Figs. 1, 2, 3, 25, 26, 27 and 28 the wire spools 255 are slipped over horizontal spindles 256, said spindles having secured thereto ratchet-wheels 257, said ratchet-wheels having integral therewith lugs 258 adapted to engage holes in said spools in alinement with said lugs and thereby lock said spindles to said spools. Spindles 256 are mounted in the sockets 260 integral with the hangers 261 and 262, said hangers are secured to the oblique braces 8 and 9 of the frame. Arms 263 are pivotally secured to the outer ends of hangers 261 and have integral therewith detents 264 in alinement with ratchet-wheels 257, said arms terminate at the inner ends in eyes 265.

The wires are wound on the spools so that as it is used by the machine it will cause said spools to revolve in direction of arrow. The detents 264 normally engage the ratchet-wheels 257. The ends of the wire are taken from the spools 255, passed through the eyes 265 of arms 263 through the slots 64 of needles 53 and into the retainers. As the bale forms the wires will be drawn down as before explained causing the wires to be drawn taut through slots 64 of needles 53 and eyes 265 from arms 263, thereby causing arms 263 to be lifted and causing detents 264 to disengage ratchet-wheels 257 and permit spools 255 to rotate. As soon as said spools have rotated so as to slack the wires the arms 263 drop and cause detents 264 to engage ratchet-wheels 257, thereby preventing further rotation of said spools and consequently preventing the wires from becoming entangled. Before proceeding with the binding mechanism the manner in which the wires are bound around a bale will be described.

Figure 17:
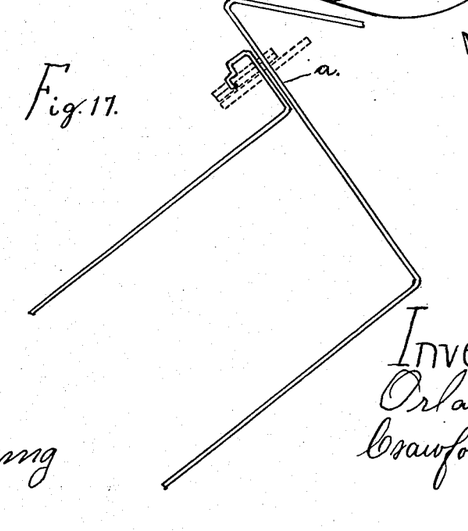
Fig. 17 is a diagram showing the wire as held in the retainer around the bale and position of wire after second throw of needle.

As the manipulation of both wires is the same, only one will be mentioned. It will be assumed in this description that the bale chamber 51 is occupied by a bale of straw. After the wire has been threaded through the needles 53, the gearing is put in motion, the needles 53 carry the wire up through the chute, through the wire twisters and into the temporary retainers where the wires are caught and held and when so held are twisted, cut off, caught in the retainer-proper and released from temporary retainer. When the needle retreats it slides along the wire by means of the slot 64 engaging the wire, and when the needle is down to the lower end of its throw the wire occupies substantially the position shown in Fig. 4. The feeding and pressing parts will be thrown in motion, the bale in the bale chamber receding as the new bale forms the wire being drawn down by the formation of the bale as shown in Fig. 17. The feeding and pressing parts being thrown out of gear and the binding parts in gear (hereinafter described). The guard arms 54 begin their downward throw, the needles 53 move upward and carry the wire above the bale into the twister wheels 76 and temporary retainer. The next operation is the twisting of the two portions of the wire at (a) Fig. 17. These portions are next severed just above the twist (Fig. 18) leaving the wire caught in the retainer-proper, Fig. 11 and in dot Fig. 10. The needles retreat during the above operation to the lower end of their throw and come to rest in position shown in Figs. 4 and 1 by means of the binding mechanism being thrown out of gear with the main drive gear later described.

We will now describe more fully the gearing by which the rocker-shaft 58 pitmen and other parts are actuated commencing with the main drive shaft 12 and referring to Figs. 1 and 24. The drive shaft 12 carries a pinion 14 which drives a gear wheel 15 mounted on a rotatable shaft 16. On the shaft 16 is secured a gear wheel 17 Fig. 20 which drives gear wheels 18 and 19 mounted on shafts 20 and 21 in the direction of arrows Fig. 19. On the shaft 21 is secured the gear wheel 70 which drives gear wheel 71 secured on shaft 69, Figs. 1, 4, and 23. The mutilated bevel gear 72 is secured on shaft 69 and drives periodically the bevel gear 73 and twister wheels 76 later described Figs. 1 and 8.

Figures 6, 16:
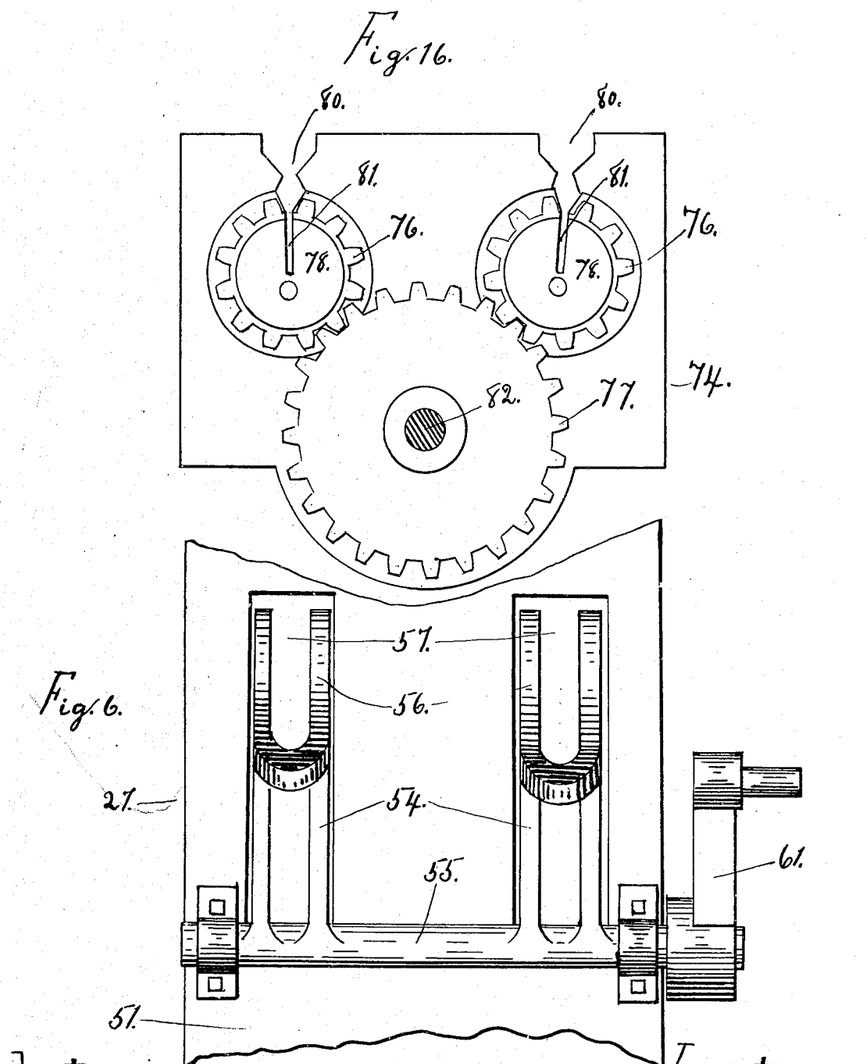
Fig. 6 is a detail plan view of the guard arms.
Fig. 16 is a detail top view of the wire twisting disks with the upper plate removed.
Figures 7, 8, 9, 10:
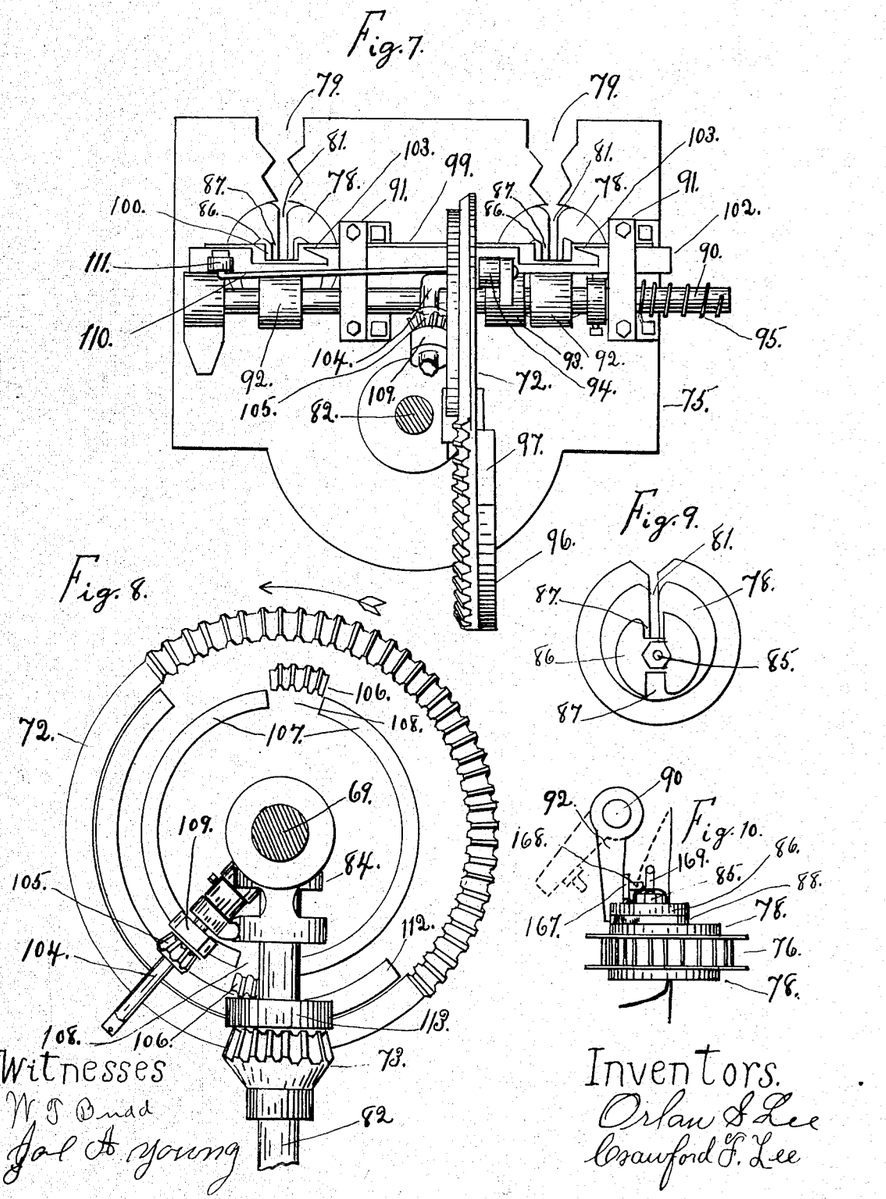
Fig. 7 is a top view of the wire twisting, cutting and retaining mechanism.
Fig. 8 is a side elevation of gears for actuating wire twisting, cutting and retaining mechanism.
Fig. 9 is a top view of one of the wire twisting, cutting and retaining disks.
Fig. 10 is a side elevation of one of the wire twisting, cutting and retaining disks and mechanism for operating cutter and retainer disk.

Referring to Figs. 4, 7, 11 and 16 the mechanism for twisting and cutting the wires will be described. Fig. 4 shows the base plate 74, of the mechanism, secured to the upper forward end of the bale chamber 51. A plate 75 is secured to the upper face of base plate 74 to inclose or cover the gearing described hereinafter. Beneath the plate 75 are mounted the twister wheels 76 and the gear wheel 77 which drives them (Fig. 16). The upper bearings of twister wheels 76 are circular openings through plate 75, which openings inclose the enlarged hubs 78 of the twister wheels 76. The lower bearings of said twister wheels are circular openings through base plate 74, said circular openings communicating with wire passages 79 cut through plate 75 which register with slots 80 in base plate 74 shown in Figs. 7, 11 and 16. Through these slots the needles 53 carry the wires into the twister wheels 76 and temporary retainers hereinafter described. Twister wheels 76 are cut by radial slots 81 of a width a little greater than that of the binding wire used (Figs. 7, 9, and 16). Said slots are parallel with each other and register, even with the slots 79 and 80 in plates 75 and 74, when rotated to that point by gear wheel 77, which is secured on shaft 82 and driven by bevel pinion 73, said shaft being journaled in base plate 74 and the compound boxes 84 on shaft 69 (Fig. 8.)

Figure 11:
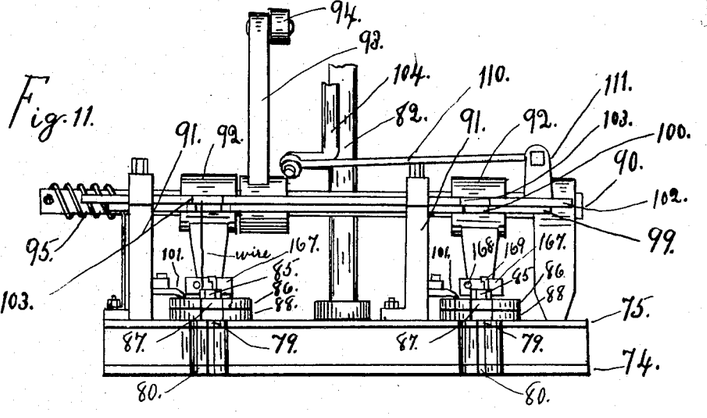
Fig. 11 is a front view of wire twisting, cutting and retaining mechanism.
Figure 12:
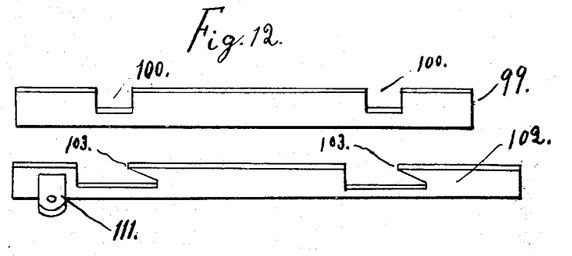
Fig. 12 is perspective view of temporary retainer bars.
Figure 13:
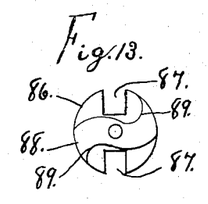
Fig. 13 is a bottom view of cutting and retaining disk.
Figure 14:
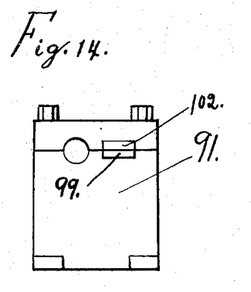
Fig. 14 is a side view of hangers for temporary retainer bars and shaft for operating mechanism for the cutter and retainer disks.
Figure 15:
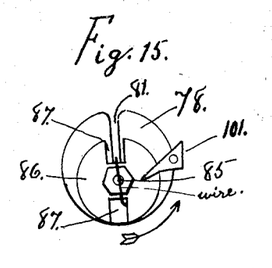
Fig. 15 is a view of the top of one of the twister disks and one of the cutter and retainer disks, showing the relative position of prongs for removing the sections of wire from the slots in the cutter and retainer disks.

Referring now to Figs. 17 and 18. Fig. 17 shows the wire as caught in the retainer proper with the end crimped under the edge of the cutter and retainer disk, pulled down over said cutter and retainer disk, down through the forward slot of said cutter and retainer disk, through the radial slot 81 of twister wheel 76 around the bale and back through the radial slot 81 and through the forward slot of said cutter and retainer disk 86. When each slot contains two wires or rather two portions of the same wire, as hereinafter explained, the mutilated bevel gear 72 is given exactly one revolution, its diameter is a multiple of the diameter of bevel pinion 73 preferably four times as great, but for purposes later described having cogs on but half its rim. Hence every rotation of mutilated bevel gear 72 imparts two rotations to bevel pinion 73 and gear wheel 77, said gear wheel 77 being twice the diameter of twister wheels 76 and therefore one rotation of mutilated bevel gear 72 imparts exactly four revolutions to twister wheels 76. When three and one-half revolutions are completed the wires are cut off (Fig. 18). The mechanism for which will be next described (Figs. 9, 10, 11 and 15). The twister wheels 76 have spindles 85 reared from their upper surface, said spindles being to the rear of radial slots 81 and having mounted thereon the cutter and retainer disks 86. Said disks having cut inwardly from their circumference two diametrically opposite slots 87, each disk having adjacent to the upper surface of twister wheels 76, a two bladed cutter bar 88 of which 89 are the cutting edges (Fig. 13). Said cutter and retainer disks overlap the radial slots 81 in twister wheels 76. The two slots 87 in each of said cutter and retainer disks registering alternately even with radial slots 81. Cutter and retainer disks 86 are caused to revolve with twister wheels 76 by means of the wire being pulled down over the tops of said cutter and retainer disks and through the forward slots 87, the wire passing on down through the radial slots 81 of twister wheels 76 (Fig. 15). Means are provided to stop the rotation of cutter and retainer disks 86, at three and one-half revolutions, the twister wheels 76 continuing to the finish of four revolutions, thereby severing the two portions of the wire from the twisted portions (Fig. 18) by means of the sharp edges of radial slots 81 coming in contact with the cutting edges 89 of cutter bars 88. Said cutter bars being secured transversely across the under side of cutter and retainer disks 86 with the cutting edges 89 of said cutter bars 88 at a suitable distance from slots 87 of cutter and retainer disks 86, so that the wires will be crimped under the edges of said cutter and retainer disks and securely held by means hereinafter described. Said means consisting of a shaft 90 mounted in the hangers 91 from the plate 75, arms 92 secured on said shaft their lower ends adapted to engage slots 87 in cutter and retainer disks 86. A coil spring 95 on shaft 90 adapted to hold arms 92 in engagement with said slots. An arm 93 carrying a roller 94 is secured on shaft 90 (Figs. 4, 7, and 11). Said roller being in the path of cam 96, said cam being integral with mutilated bevel gear 72 and parallel to the circumference of said mutilated bevel gear, excepting the forward portion which curves inwardly forming an incline 97. It is evident that the rotation of mutilated bevel gear 72 in direction of arrow will cause incline 97 of cam 96 to engage roller 94 and force lever 93 forward thereby causing arms 92 to disengage the slots 87 of cutter and retainer disks 86 and thereby permit said cutter and retainer disks to be revolved with twister wheels 76 in the twisting operation until said cam 96 disengages said roller at three and one-half revolutions of twister wheels 76 when spring 95 forces arms 92 into engagement with slots 87 of cutter and retainer disks 86 thereby stopping the rotation of said cutter and retainer disks, the twister wheels 76 finishing the remaining half revolution, thereby severing the wires and crimping the ends of the severed portions under the edges of cutter and retainer disks 86 (Figs. 11 and 15 also shown in dot Fig. 10). When the wires are so caught they are securely held within the slots 87 of cutter and retainer disks 86 by means of plates 167 secured on arms 92 and overlapping said slots.

Referring now to Figs. 10, 15, 17, and 18 the relative positions which the wires assume in the twisting operation will be described. In Fig. 17 the wire is shown as being caught in the rearward slot of cutter and retainer disk, pulled over and down through the forward slot 87 of cutter and retainer disk 86 and through the radial slot 81 of twister wheel 76 around the bale and back through the radial slot 81 of twister wheel 76 and forward slot 87 of cutter and retainer disk 86. Fig. 18 shows the position of wire immediately after having been severed. Fig. 10 shows the wire as passing through the radial slot 81 of twister wheel 76 and through the forward slot 87 of cutter and retainer disk 86 immediately preceding the twisting operation. The position of wire as shown in dot being as it will appear at the finish of the twisting operation. The forward slot of cutter and retainer disk at the beginning of the twisting operation becoming the rearward slot of cutter and retainer disk at the finish of said twisting operation by means of the rotation of said cutter and retainer disk having been stopped at three and one-half revolutions of said twister wheels as before described. The wires at the finish of the twisting operation are thus always caught in the rearward slot of cutter and retainer disk and are pulled down over said cutter and retainer disk as before described and as shown in Fig. 15. The twister wheels 76 rotate in direction of arrow Fig. 15 thereby bringing the wires in the rearward slots of cutter and retainer disk 86 into engagement with prongs 101 from hangers 91 (Figs. 11 and 15) and consequently causing said wires to be released from said slots. It is desired that the wires passing through the eyes of needles 53 and through the radial slots 81 shall be held immediately above the center of the twister wheels 76 during the twisting operation and be released immediately after. To provide for this a temporary retainer is devised (Figs. 7, 11, 12, and 14) consisting of a bar 99 having slots 100 therein secured to hangers 91 on plate 75, said slots being immediately above the center of twister wheels 76. A bar 102 is slidably mounted on bar 99 and in said hangers. Bar 102 is provided with prongs 103 adapted to be moved across slots 100 and to so retain the wires within slots 100 and to release the wires by withdrawing said prongs. The compound boxes 84 (Fig. 8) has mounted therein a crank shaft 104 which has secured thereto a pinion 105 which is intermittently rotated by intermittent gears 106 on the mutilated bevel gear 72, said intermittent gears being integral with mutilated bevel gear 72 and in alinement with pinion 105 on shaft 104. The circular stop cam 107, integral with mutilated bevel gear 72, has recessed portions 108 along side of intermittent gears 106 and is in alinement with double cam shoe 109. A pitman rod 110 is mounted at one end on crank shaft 104 the other end being pivotally secured to lug 111 on bar 102 so as to alternately drive the prongs 103 on bar 102 across the slots 100 in bar 99 and to withdraw said prongs by the action of said intermittent gears on said pinion. The cam 107 normally engages the double cam shoe 109 and prevents rotation of crank shaft 104, except when the recessed portion registers with said shoe.

Referring now to Figs. 10, 11 and 4 the position of the wires at the finish of the twisting operation after having been released by temporary retainer is shown. Said wires are pulled down by the formation of the bale, over the center of cutter and retainer disks, as before explained. It is desired that said wires shall be retained immediately over the center of cutter and retainer disks. To provide for this plates 167 are provided with pins 168 which normally overlap cutter and retainer disks 86. Spindles 85 are provided with pins 169. The wires are thus retained over the centers of said cutter and retainer disks.

A summary of the binding operation with reference to the time of the parts contributing thereto is as follows:—The gear wheel 71 on shaft 69 is rotated in direction of arrow Fig. 1, thereby carrying the crank arm 66 and mutilated bevel gear 72. Said crank by means of pitmen 67 and arm 62 from rocker shaft 58 forces the wire needles 53 up through the chute 27, thereby carrying the wires into the radial slots 81 of twister wheels 76 through the forward slots 87 of cutter and retainer disks 86 and into the slots 100 of temporary retainer. Simultaneously with the above movement the guard arms 54 are forced downward into the chute 27 by means of arm 68 from rocker shaft 58, pitman rod 63, and crank arm 61, from transverse shaft 55, which carries said guard arms. While the wire needles are being forced upward through the chute and the guard arms downward into the chute, the circular stop cams 112 and 107 integral with mutilated bevel gear 72 slide on cam shoe 113 and double cam shoe 109 respectively, thereby preventing rotation of shaft 82 and crank shaft 104 respectively. When the needles have been driven to the upper end of their throw and the wires drawn into the radial slots 81 in twister wheels 76 and into the slots 100 of temporary retainer as above explained, they are held within said slots during the twisting operation by means of the prongs 103 on bar 102, being moved across the slots 100 in bar 99 by the action of intermittent gear 106 on pinion 105. The continued rotation of shaft 69 and mutilated bevel gear 72 drives needles 53 and guard arms 54 back to normal position, brings cam 96 into engagement with roller 94 on arm 93, thereby causing arms 92 to disengage slots 87 of cutter and retainer disks 86, thereby permitting said cutter and retainer disks to be revolved with and by twister wheels 76; brings cogs of mutilated bevel gear 72 into engagement with pinion 73 thereby driving twister wheels. When three and one-half revolutions of said twister wheels are completed by revolution of mutilated bevel gear the cam 96, disengages roller 94, thereby permitting spring 95 to urge arms 92 in to engagement with slots 87 of cutter and retainer disks, thereby stopping the rotation of said cutter and retainer disks and causing the wires to be severed and caught within the slots of said cutter and retainer disks by the continued rotation of twister wheels 76. The wires being caught and held as above explained are released from temporary retainer by the continued rotation of mutilated bevel gear 72, bringing intermittent gear 106 into engagement with pinion 105.

It is evident that the bale binding mechanism operates periodically though the main drive shaft's rotation is continuous.

A description of the device for throwing the feeding mechanism and the binding mechanism alternately into gear with the main driving gear is as follows: Referring to Figs. 1, 19, 20, 21, 22 and 23 the shaft 16 is continuously rotated by gear 15 and carries the intermediate gear wheel 17. Said gear wheel drives the two gear wheels 18 and 19 of equal diameter though not necessarily of the same diameter as gear 17. Wheels 18 and 19 are not keyed to their shafts but are caused periodically to engage said shaft by the means to be described. Shaft 20 has secured thereto a pair of parallel arms 114, a crank shaft 115 carrying a roller 116 is rotatably mounted in said arms and parallel to said shaft. A coil spring 117 around said crank shaft and between said arms urges crank and roller inwardly. An arm 118 is secured to said crank shaft. Detent 119 is secured to the web or one of the spokes of gear wheel 18, its forward surface with reference to direction of rotation of said gear wheel (as indicated by arrow Fig. 19) is formed in the arc of a circle with crank shaft 115 as its center and is in alinement with roller 116. Arms 123 are likewise secured to shaft 21 and carry crank shaft 121, which has secured thereto arm 125, and carries roller 122. Gear wheel 19 has secured thereto a detent 120 in alinement with said roller.
An oscillating lever 126 is pivotally mounted on gudgeon 127 from standard 128, said standard being secured to frame 1. One end "b" of lever 126 is curved upward in the arc of a circle with pivoted point as its center, the other end "c" is curved downward in the arc of a circle with pivoted point as its center. An upwardly extending arm 129 is secured to said lever, said arm having at its outer end a slot 130, said slot being curved in the arc of a circle with the pivoted point of said lever as its center. A crank arm 131 is pivotally mounted on gudgeon 127 with the crank portion extending through slot 130. Rod 132 is pivotally mounted at its lower end on said crank arm, its upper end passing through a slot in the overhanging arm 133 of standard 128. Rod 133 is inclosed by a spiral compression spring 134 which is confined between the arm 133 and collar 135 on said rod. Spring 134 thus keeps crank in engagement with one or the other end of slot 130 and consequently one or the other end of lever 126 is depressed according to which end of slot is engaged by said crank. Lever 126 is in alinement with arms 118 and 125 and by means of lugs 136 integral with the said lever engaging alternately lug 137 from standard 128, is limited to sufficient movement so that the ends may be alternately thrown down in the path of the arms 125 and 118 respectively. A pull rod 138 is pivotally mounted at one end on crank arm 131, the other end is pivotally secured to slide bar 139 (Fig. 23 and in dot Fig. 1) said slide bar being mounted in guides 140 from frame 1 and having a lug 141 secured thereto in alinement with arm 142 from shaft 69 and being so adjusted that arm 142 will be brought into engagement with said lug, by means of shaft 69 being revolved in the direction of arrow in the binding operation, thereby shifting crank 131 to the right in Figs. 1 and 19, thereby depressing end "c" of lever 126 so that the rotation of shaft 21 and arm 125 will bring said arm into engagement with curved portions "c" of lever 126, thereby by the continued rotation of shaft 21 causing roller 122 to be lifted above detent 120, thus stopping rotation of shaft 21 and throwing the binding mechanism out of gear.

Referring now to Figs. 13, 19, 20, 21, and 23 arm 143 is pivotally mounted on shaft 26. A gudgeon 144 integral with said arm has mounted thereon a detent 145, said detent having integral arms 146 and 147. A rod 148 is pivotally secured to arm 146. The other end of rod 148 passing through a slot in the overhanging arm 149. Rod 148 is inclosed by spiral compression spring 150 which is confined between the overhanging arm 149 and a collar 151 on said rod. A pull rod 152 is pivotally mounted at its ends on the crank 131 and gudgeon 144. Arm 153 is secured on shaft 26 and is in alinement with detent 145. Shaft 26 rotates in direction of arrow Fig. 2 and while a bale is forming by the operation of the feeding and pressing parts, said detent remains in the upper position in Fig. 1, said feeding and pressing parts continuing in operation until said detent, is thrown down in the path of arm 153 by the means to be described.

Referring to Figs. 1, 21, 22, and 23 the shaft 155 is mounted in a hanger 156 from bale chamber 51 and hanger 157 from the frame 1. Said shaft has secured thereon the sprocket wheel 158 in alinement with a slot cut in the bale chamber 51 with the points of the prongs of said sprocket wheel extending through said slot. It is evident that the passage of the bales through the bale chamber will cause the sprocket wheel 158 to be rotated thereby revolving the shaft 155. Arm 160 is loosely mounted on said shaft. Arm 159 is secured to said shaft, its outer end being adapted to be in alinement with arm 160. A spiral compression spring 161 is retained in position between arms 159 and 160 by means of a guide rod 162 passing through slots in said arms and limiting the movement of arm 160. A slide rod 163 is mounted in the eyes in the guides 164 from hanger 157 and frame 1.

A pull rod 165 is pivotally secured to arm 147 from detent 145 and slide rod 163, said slide rod having a collar 166 secured thereto in alinement with arm 160 from shaft 155. In the feeding and pressing operation the bales are forced out through the bale chamber, thereby rotating sprocket wheel 158 by means of the bale engaging the points of the prongs of said sprocket wheel, thereby rotating shaft 155 which brings arm 160 into engagement with collar 166 on slide rod 163. The continued rotation of shaft 155 causes spring 161 to be compressed and slide rod 163 to recede to the right in Fig. 1, thereby depressing detent 145 into path of arm 153 on shaft 26 (shown in Fig. 21) the spring 150 normally retaining said detent in the two positions shown. When slide rod 163 carrying collar 166 has been moved to the left (Fig. 1) by means of the pull rod 165, arm 143 and detent 145 mounted on said arm engaging the rotating arm 153, the spring 161, having urged arm 160 upward out of the return path of collar 166, the slide rod 163 is permitted to retain its normal position. The engagement of detent 145 with rotating arm 153 simultaneously with the movement of arm 143 pull rod 165 and slide rod 163 causes the end b of lever 126 to be depressed into the path of arm 118, the end c of lever 126 to disengage arm 125 permitting roller 122 to be urged by spring 124 into the path of detent 120 and slide rod 139 to move to the left in Fig. 1, said slide rod carrying lug 141 to a position to be engaged by arm 142 on shaft 69 by means of pull rod 152 mounted at its end on gudgeon 144 on arm 143 and crank arm 131, shifting said crank into position shown in Fig. 19, the spring 134 normally retaining lever 126 in the two positions shown in Figs. 1 and 19. When lever 126 is shifted to position shown in Fig. 19, by means of arm 153 pull rod 152 and detent 145, said detent is thrown to the upper position (Fig. 1) out of the path of arm 153 by means of the inclined portion of detent 145 engaging lug 154 on cam 36 as will be readily understood by reference to Fig. 21. Detent 145 remains in the upper position shown in Fig. 1 until again thrown down by the action of the sprocket wheel 158 as before described.

When end b of lever 126 is so depressed arm 118 by the rotation of shaft 20 is brought into engagement with lever 126, thereby causing roller 116 to be lifted above detent 119 thereby stopping rotation of shaft 20 and throwing the feeding and pressing parts out of gear. When end b of lever 126 is depressed as before described end c is lifted above arm 125, thereby allowing spring 124 to urge roller 122 into the path of detent 120, thereby carrying shaft 21 and starting the binding mechanism in motion. The gear wheel 71 and shaft 69 in the binding operation rotate in direction of arrow Fig. 1, thereby bringing arm 142 into engagement with lug 141 and by means of pull rod 138 shifting the lever 126 and arm 143 back to position shown in Fig. 1.

A general operation of the gear shifting device is as follows:—The shaft 21 carries the gear wheel 70 which drives the binding mechanism. The shaft 20 carries the gear wheels 22 and 23 which drives the feeding and pressing mechanism, consequently the binding mechanism will be started and the feeding and pressing mechanism stopped every time that end b of lever 126 descends so as to engage the end of arm 118, thereby causing roller 116 to be lifted up from in front of detent 119 on gear 18 which continues its revolution but shaft 20 comes to rest. At the same time end c of lever 126 is raised thereby releasing arm 125 and permitting spring 124 to urge roller 122 into the path of detent 120 which engages it and thereby starts shaft 21 and the parts contributing to the binding operation, and as is evident the binding mechanism will be stopped and the feeding and pressing mechanism started every time that end c of lever 126 descends so as to engage the end of arm 125, thereby causing roller 122 to be lifted above detent 120 on gear 19 which continues its rotation but shaft 21 comes to rest. At the same time that end c of lever 126 descends end b of said lever is raised, thereby permitting roller 116 to be urged into the path of detent 119 which engages it, thereby starting shaft 20 and the parts contributing to the feeding and pressing operation.

A recapitulation of the operation of the different parts in their consecutive order is as follows:—The material to be baled is fed into the mouth 28 of the chute 27. The feeding arms 30 carry it into the chute to a point from where it is taken by the press prongs 38 and forced into the bale chamber 51. The wires having been previously caught in the retainers are drawn down by the formation of the bale. The previously bound bale in the bale chamber recedes as the new bale forms thereby revolving the sprocket wheel 158 and causing the detent 145 to be forced downward into the path of arm 153 which engages it and thereby causes lever 126 to be shifted so as to cause end $b$ of lever 126 to be thrown into the path of arm 118 which engages it, thereby causing roller 116 to be lifted out of the path of detent 119, thereby throwing the feeding and pressing parts out of gear. When end $b$ of lever 126 is depressed end $c$ is lifted, thereby disengaging arm 125 and allowing spring 124 to urge roller 122 into the path of detent 120 which engages it, thereby throwing the binding part in gear. The guard arms 54 move downward into the chute 27. The needles 53 move upward through the chute and carry the looped wires into the slots of the twister wheels and cutter and retainer disks and into the slots 100 of the temporary retainer.

The prongs 103 on bar 102 are moved across slots 100, thereby retaining the wires within said slots. The cam 96 engages roller 94 and causes arms 92 to disengage the slots of the cutter and retainer disks 86, the guard arms and needles retreating to their normal position. The twister wheels 76 and cutter and retainer disks 86 twist the wires, sever the twisted portions and retain the wires within the slots of said cutter and retainer disks. The prongs 103 on bar 102 are withdrawn from across slots 100. Arm 142 engages lug 141 thereby shifting lever 126 so that end $b$ disengages arm 118, thereby allowing roller 116 to be urged into the path of detent 119 which engages it, thereby starting the feeding and pressing parts in operation. When end $b$ is lifted end $c$ is depressed into the path of arm 125 which engages it and thereby causes roller 122 to be lifted up from in front of detent 120, thereby throwing the binding parts out of gear.

Having described our invention what we claim as new and desire to secure by Letters Patent, is 1. In a baling machine with a curved chute, the combination with a transverse feeder shaft 26 and gear wheels for driving said shaft secured thereto, of a plurality of transverse shafts parallel to said transverse feeder shaft 26 and carried by said gear wheels, a plurality of feeder arms secured to each of said transverse shafts in alinement with slots in the chute, a crank arm secured to each of said transverse shafts, rollers for said crank arms and a stationary grooved guide for said rollers substantially as described.

2. In an automatic binding device for a baling machine, the combination with a plurality of rotatable wire twisting wheels with radial slots therein; of a plurality of cutter and retainer disks rotatably mounted on said twister wheels and two diametrically opposite slots in each of said cutter and retainer disks and means for stopping the rotation of said cutter and retainer disks for severing and retaining the wires substantially as described.

3. The combination in a pressing device for a baling machine of a plurality of press prongs having a cross bar secured thereto, with forwardly extending arms secured to said cross bar, wrist pins secured to said arm and pitmen mounted on said wrist pins for operating said pressing device substantially as described.

4. In a pressing device for a baling machine, the combination with a plurality of press prongs having a cross bar secured thereto, forwardly extending arms from said cross bar and wrist pins from said arms; of pitmen wheels having wrist pins thereon, pitmen mounted on said wrist pins from said pitmen wheels and said wristpins from said arms, stationary guides for the loose ends of said pitmen and anti-friction rollers for said guides whereby said press prongs are suspended on said pitmen and are given an oscillating and radial movement by the revolution of said pitmen wheels substantially as described.

5. In an automatic binding device for a baling machine, the combination with wire twister wheels with cutter and retainer disks rotatably mounted thereon having two diametrically opposite slots therein; of a transverse actuating shaft, arms secured to said shaft for engaging said slots and an arm carrying a roller secured to and actuating said shaft substantially as described.

6. In an automatic binding device for a baling machine, the combination with cutter and retainer disks, having slots therein and a transverse shaft carrying arms for engaging said slots; of plates secured to said arms overlapping said slots and a spring on said shaft for retaining said arms in engagement with said slots substantially as described and for the purpose set forth.

7. In an automatic binding device for a baling machine, the combination with wire twister wheels with cutter and retainer disks mounted on spindles from said twister wheels, arms adapted to engage slots in said cutter and retainer disks and plates on said arms overlapping said slots; of pins from said plates and said spindles for guiding and retaining the wires over the centers of said cutter and retainer disks and stationary prongs for removing the wires from said slots substantially as and for the purpose set forth.

8. In a temporary wire retaining device for a baling machine, the combination with a transverse bar having slots therein; of a bar slidably mounted on said transverse bar, prongs thereon, registering with said slots in said transverse bar, a lug on said pronged bar and a pitman connecting said lug to a crank on a rotatable crank shaft for operating said temporary retainer substantially as described.

9. In a baling machine having a curved chute, the combination with wire carrying needles secured to a rocker shaft; of a transverse shaft mounted on said chute, a plurality of looped guard arms secured to said shaft in alinement with slots in said chute, an arm on said transverse shaft, an arm on said rocker shaft and a pitman connecting said arms for actuating said needles and said guard arms in conjunction substantially as described.

10. In a gear shifting device for a self binding baling machine, the combination with a rotatable shaft, a pinion secured on said shaft for driving the binding mechanism and a gear wheel loosely mounted on said shaft; of a detent secured to the web or spoke of said gear wheel, arms secured on said shaft, a crank shaft rotatably mounted in said arms, a roller mounted on said crank shaft, a spring on said crank shaft normally retaining said roller in the path of said detent and an arm on said crank shaft for engaging an oscillating lever one end of which when depressed engages said arm and thereby throws the binding mechanism out of gear with said shaft substantially as and for the purpose described.

11. In a gear shifting device for a self binding baling machine, with a rotatable shaft, a pinion secured on said shaft for driving the feeding and pressing mechanism and a gear wheel loosely mounted on said shaft; the combination of a detent secured to the web or spoke of said gear wheel, arms secured to said shaft, a crank shaft rotatably mounted in said arms, a roller mounted on said crank shaft, a spring on said crank shaft normally retaining said roller in the path of said detent and an arm secured to said crank shaft for engaging an oscillating lever one end of which when depressed engages said arm and thereby throws the feeding and pressing mechanism out of gear with said shaft substantially as and for the purpose described.

12. In a gear shifting device for a self binding baling machine, with an oscillating lever pivotally mounted on a gudgeon from a standard from the frame; the combination of an arm secured to said lever, a slot in said arm, a crank arm mounted on said gudgeon, the crank portion extending through said slot, a guide rod mounted at one end on said crank portion, the other end passing through a slot in the over-hanging portion of said arm, a spring on said guide rod, an arm secured on said rotatable feeder shaft in alinement with said detent, said spring retaining said detent in or out of the path of said arm, a pull-rod one end of which is mounted on said gudgeon of said detent, the other end mounted on said crank arm on said gudgeon from said standard so that when said detent is depressed and retained by said spring it is engaged by said arm, and by means of said pull-rod causes said crank arm to engage the opposite end of said slot and actuates said lever for throwing the feeding and pressing mechanism out of gear and the binding mechanism in gear substantially as and for the purpose described.

13. In a device for operating a gear shifting device for a self binding baling machine, the combination with a curved chute terminating in a bale chamber, a transverse feeder shaft, an arm secured on said feeder shaft, an arm loosely mounted on said feeder shaft, a gudgeon on said arm and a detent mounted on said gudgeon; of a shaft mounted transversely above said bale chamber, a sprocket wheel secured on said shaft, said sprockets extending through a slot in said bale chamber, an arm secured on said transverse shaft, an arm loosely mounted on said shaft, a spring normally retaining said loosely mounted arm in advance of said arm on said transverse shaft, a slide rod mounted parallel to the plane of rotation of said arm, a collar secured to said slide rod, adapted to be engaged by said loosely mounted arm, a pull-rod connecting said slide rod with a downwardly extending arm from said detent, thereby causing said detent to be depressed by the rotation of said sprocket wheel substantially as and for the purpose described.

14. In a device for operating a gear shifting device for a self binding baling machine, with an oscillating lever mounted on a gudgeon from a standard, an arm from said lever, a slot in said arm, a crank arm mounted on said gudgeon, said crank portion extending through a slot in said arm and a transverse shaft; the combination of an arm secured on said shaft, a slide bar 139 mounted parallel to a plane of rotation of said arm, a lug secured to said slide rod adapted to be engaged by said arm and a pull-rod connecting said slide rod and said crank on said crank arm substantially as described.

15. In a self binding baling machine, the combination with wire carrying needles and spools for reeling off wire; of a transverse shaft for carrying a wire spool mounted in hangers from the frame, a ratchet-wheel secured to said shaft, a pin on said ratchet wheel adapted to engage a hole in said wire spool for locking said wire spool to said shaft, an arm pivotally mounted on said hanger, a slot in the free end of said arm, a detent on said arm adapted to engage said ratchet wheel thereby stopping the rotation of said spool substantially as and for the purpose described.

ORLAN S. LEE.
CRAWFORD F. LEE.

Witnesses:
W. T. BUDD,
JAS. A. YOUNG.